US006685365B2

United States Patent
White

(10) Patent No.: US 6,685,365 B2
(45) Date of Patent: Feb. 3, 2004

(54) CONSOLIDATED TRANSMISSION CABLES, INTERCONNECTIONS AND CONNECTORS

(75) Inventor: Dawn White, Ann Arbor, MI (US)

(73) Assignee: Solidica, Inc., Ann Arbor, MI (US)

( * ) Notice: Subject to any disclaimer, the term of this patent is extended or adjusted under 35 U.S.C. 154(b) by 0 days.

(21) Appl. No.: 10/014,984

(22) Filed: Dec. 11, 2001

(65) Prior Publication Data

US 2002/0071643 A1 Jun. 13, 2002

Related U.S. Application Data

(60) Provisional application No. 60/254,981, filed on Dec. 11, 2000.

(51) Int. Cl.[7] .............................................. G02B 6/255
(52) U.S. Cl. ......................... 385/99; 385/102; 385/136
(58) Field of Search ................ 385/95–99, 136, 385/102; 228/190; 250/227.16; 428/379, 614

(56) References Cited

U.S. PATENT DOCUMENTS

| | | | | |
|---|---|---|---|---|
| 4,950,043 A | * | 8/1990 | Russom ........................ | 385/99 |
| 5,002,836 A | * | 3/1991 | Dinwoodie et al. ......... | 428/614 |
| 5,026,140 A | * | 6/1991 | Russom ........................ | 385/99 |
| 5,245,180 A | * | 9/1993 | Sirkis ..................... | 250/227.16 |
| 5,283,852 A | * | 2/1994 | Gibler et al. ............... | 385/136 |
| 5,289,967 A | * | 3/1994 | Bampton et al. ........... | 228/190 |
| 6,012,856 A | * | 1/2000 | Kim et al. ................... | 385/99 |
| 6,245,425 B1 | * | 6/2001 | McCullough et al. ....... | 428/379 |

* cited by examiner

Primary Examiner—Phan T. H. Palmer
(74) Attorney, Agent, or Firm—Gifford, Krass, Groh, Sprinkle, Anderson & Citkowski, PC

(57) ABSTRACT

A continuous, single-step, low-temperature process combines metal coating with the splicing of fibers, producing a single, continuous low-cost process for embedding fibers in metal, and/or the splicing of fibers with a joint featuring uniform composition and high strength requiring no additional adhesives. The method can be used to create terminations for cables, or it can be used as a method of splicing or joining optical fibers by positioning the ends of the two fibers under the foils, so that they abut prior to creating the bond. The consolidation material may be provided in sheets, with or without fiber-locating grooves or, alternatively, droplets may be used. In the preferred embodiment, ultrasonic vibrations are used as the source of consolidation energy. A range of metals are suited to the process, including aluminum, copper, titanium, nickel, iron and their alloys as well a numerous other metals of more limited structural utility.

32 Claims, 2 Drawing Sheets

CONSOLIDATED TRANSMISSION CABLES, INTERCONNECTIONS AND CONNECTORS

REFERENCE TO RELATED APPLICATIONS

This application claims priority from U.S. provisional patent application Serial No. 60/254,981, filed Dec. 11, 2000, the entire contents of which are incorporated herein by reference.

FIELD OF THE INVENTION

This invention relates generally to multi-fiber optical paths and, in particular, to the use of a relatively low temperature consolidation process capable of embedding multiple fibers into a suitable material to produce optical interconnects and other useful products.

BACKGROUND OF THE INVENTION

The expanding use of optical fiber cabling for data, voice and video transmission is creating a need for more efficient means for connecting optical cables of all types to each other, as well as to optical switches, devices, routers, and other devices. Most existing termination and connection methods require large numbers of small mechanical connectors applied to the fibers. Since optical networks are comprised of hundreds or thousands of fibers, these interconnection methods are slow and labor intensive.

It would be advantageous, therefore, to devise a technique whereby multiple, aligned fibers may be embedded into a material on an automated basis to provide optical cable connectors, interconnections, and so forth. Although there have been attempts to locate optical fibers into non-optical substrates, the processes used are less than optimal. For example, U.S. Pat. Nos. 4,950,043 and 5,026,140 to Russom describes a means of embedding optical fibers in titanium. The optical fibers are coated with aluminum using a process such as PVD, and then placed in a bed of titanium or titanium and aluminum powders and hot isostatically pressed to produce a solid article, with the optical fibers coated in TiAl. High temperatures and pressures are used to produce consolidation of the titanium around fibers. Such "HIPing" requires that batches of material be processed in a chamber, increasing cost, and making it difficult to produce very long embedded fibers, such as would be useful in a cable.

In U.S. Pat. No. 5,283,852, Gibler et al. describe a technique for embedding an optical fiber in a liquid metal by supplying special tubes to relieve stresses at the terminations of the metal-fiber zone. The inventors emphasize that allowing the fiber to exit the metal without damage would represent a significant improvement.

U.S. Pat. No. 5,245,180 to Sirkis discusses a means of interpreting data supplied by a metal coated fiber. However, the object of the invention is not to provide a more efficient means of coating fibers, or embedding them in a metal object. Sirkis suggests electroless deposition methods, vapor deposition, etc., as means of applying the needed coating.

In U.S. Pat. No. 5,289,967, Bampton et al. disclose a means of embedding optical or structural reinforcing fibers in a metal matrix. They embed the fibers in a powder and employ a transient liquid phase to produce rapid, isothermal solidification of the matrix material, preventing thermal shock and like problems associated with embedding ceramic fibers in liquid metals. Clearly, an all-solid-state process would be an improvement over this system, since transient liquid phase bonding requires careful composition control in the powders, and is very limited with respect to the materials and compositions which are suitable.

In U.S. Pat. No. 6,012,856, Kim et al. describes a means of reinforcing a splice between metal coated optical fibers. The metal coated fibers are spliced together, but the joint is not strong enough to allow bending of the fibers during installation. According to the process, a second connector is added with a grooved for locating the fibers, to which an adhesive is added. In U.S. Pat. No. 6,193,421, Tamekuni et al. describe a means of fixturing a previously metal coated fiber in a groove, without exerting pressure on it, so that a fiber can be placed. U.S. Pat. No. 6,219,484 to Rhee et al. describes a means of placing previously metal coated fibers, terminating them and bonding them to another previously metal coated layer via laser soldering or an epoxy filling. U.S. Pat. No. 6,303,182 Eggleton, et al. describes the coating of an optical fiber with a thin coating for the purpose of locally affecting mechanical or physical properties of the fiber. Evaporative coatings are cited as a means of deposition, while a mask is used to ensure local deposition or lack thereof.

Not only would multiple aligned fibers provide a foundation for optical cable connectors and interconnections, if an electrical conductor were used as the surrounding material the fibers could be used for reinforcement or, more optimally, to create a combination signal and power-carrying cable combination. Electrical transmission lines are typically fabricated from copper for its high conductivity. High purity aluminum has very high conductivity also, and is much lighter and cheaper than copper, making it an attractive material for electrical transmission lines. However, the low strength and creep resistance of high purity aluminum cause problems in practical application.

Fiber reinforcement has been suggested as a means of rendering high purity aluminum sufficiently strong and creep resistant to function as an electrical transmission line material. U.S. Pat. Nos. 6,180,232 and 6,245,425 to McCullough et al. have claimed a means of producing a fiber reinforced transmission line which makes use of polycrystalline alumina ($Al_2O_3$) fibers to reinforce a substantially pure aluminum alloy or an alloy containing up to 2% copper, as a transmission line material with enhanced properties. In order to form this material, McCullough discloses a method much like that provided in U.S. Pat. No. 5,002,836 to Dinwoodie et al. to produce metal matrix composites and articles fabricated therefrom.

However, the methods proposed by McCullough, Dinwoodie, and others, rely on infiltration of fiber bundles with molten aluminum. Much of the art disclosed deals with means of addressing the numerous problems created when a ceramic fiber is exposed to molten aluminum, such as thermal shock, the tendency of the fiber to dissolve, and the production of undesirable second phase particles at the fiber-matrix interface which detract from the interface bond quality.

Thus, despite these advances, the need nevertheless remains for a technique capable of rapidly and precisely locating and fixturing large numbers of optical fibers. Such an approach would provide benefits in reducing the cost of optical systems, and decreasing loss at interconnections. Advantageously, should the material used to embed the fibers itself be electrically conductive, the possibility exits for an integrated signal-and power-carrying cable.

SUMMARY OF THE INVENTION

This invention improves upon prior art methods and apparatus by providing a continuous, single-step, low-temperature process to embed one or more optical fibers into a surrounding material. In contrast to existing approaches, the process combines metal coating with splicing of fibers, producing a single, continuous low-cost process for embedding fibers in a metal, alloy, or other suitable material, as well as splicing fibers with a joint of uniform composition requiring no additional adhesives, resulting in high strength. A range of metals are suited to this process, including aluminum, copper, titanium, nickel, iron, and alloys thereof, as well a numerous other of materials of perhaps more limited structural utility.

Broadly, the invention provides a method of depositing and consolidating material without the need for a binder. The technique affords many of the advantages of 3-D printing, including small particle size and material flexibility. It is well suited to the embedding of optical fibers because the process uses small feedstock particles which minimize the pressure applied around the fibers to consolidate them, thereby reducing the chance of fiber damage. The method can be used to create terminations for cables, or it can be used as a method of splicing or joining optical fibers by positioning the ends of the two fibers under the foils, so that they abut prior to creating the bond. The consolidation material may be provided in sheets, with or without fiber-locating grooves or, alternatively, droplets may be used. In the preferred embodiment, ultrasonic vibrations are used as the source of consolidation energy.

In the preferred embodiment the embedded fibers carry low-power optical signals as a means of data transmission. In alternative embodiments, however, the fiber(s) function as a sensor, or as a reinforcement, since quartz fibers are themselves quite strong, the invention may be used in other applications, including. For example, with respect to electrical power transmission, a high-purity, high-conductivity aluminum wire with continuous structural fiber reinforcement according to the invention may be employed to make it strong and creep resistant. Moreover, if the fiber(s) carry data transmissions, such a reinforcing effect may achieved along with sufficient bandwidth to supply commercial and residential businesses. Optionally, a combination of structural and optical fibers could be used for reinforcement purposes. If one or more of the fibers are employed as a sensor, a cable with integrated breakage detection may be realized.

DETAILED DESCRIPTION OF THE INVENTION

Figure 1A:
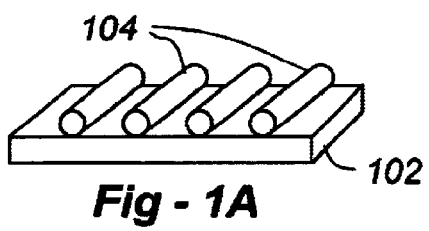
FIG. 1A is a drawing which shows the use of a foil sheet acting as a base material for an optical connector according to the invention.

Reference is made to the drawings in describing the invention. Beginning with FIG. 1A, a foil sheet 102 acts as the base material for the connector. Although aluminum is used in the preferred embodiment, other suitable metals, alloys and plastic/ceramic-based materials may be used. Accordingly, references to "aluminum" should be taken to include these other materials.

Figure 1B:
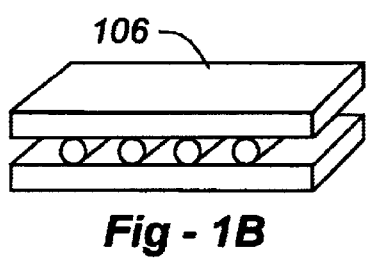
FIG. 1B shows how a second layer of foil is placed over the foil/fiber assembly of FIG. 1A.

Optical fibers 104 to be fixtured are precisely placed on the foil surface. The foil substrate may be featureless or features may be etched in the foil surface for use as a guide to locate the fibers. A precision fiber placement system may also be used to locate the fibers on the foil substrate. A second layer of foil 106 is placed over the foil/fiber assembly, as shown in FIG. 1B.

Figure 1D:
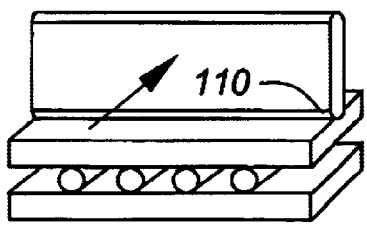
FIG. 1D illustrates a foil feeding system, a fiber placement system, and an ultrasonically excited roller suitable for continuously embedding optical fiber in metal.
Figure 1C:
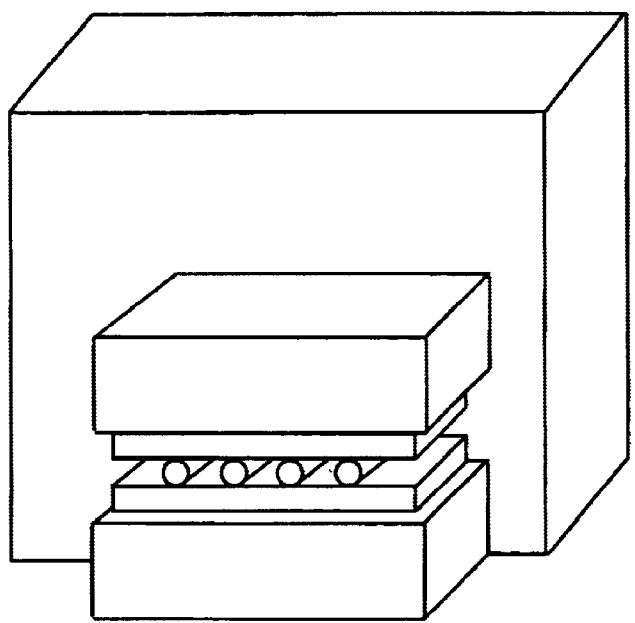
FIG. 1C depicts how an ultrasonic welding system is used to consolidate the assembly of FIG. 1B.

As shown in FIG. 1C, an ultrasonic welding system is used to consolidate the assembly. Application of the ultrasonic energy on aluminum, for example, has the effect of reducing the flow stress, allowing it to plastically deform uniformly around the fibers. In addition, where the two layers come into contact in the interfiber spacing, welds together, as it would if the fibers were not present. This has the effect of producing a bonded optical fiber, with uniform stress applied to it, and a hermetic interfiber seal.

The bonds can be produced using stationary welding tools, or rotating welding tools, depending on the number and length of the fibers to be bonded, and the desired geometry of the splice. Single or multiple layers splices can be produced. Additional layers of fibers can be added to the first layer, by precisely positioning additional fibers, and covering them with a further layer of foil prior to consolidation.

Figure 2:
FIG. 2 illustrates a resulting bond, with optical fibers hermetically sealed in aluminum.

FIG. 2 illustrates the resulting bond, with the fibers hermetically sealed in aluminum, in this case. It can be seen that the bond line between the foil substrate and superstrate is located approximately half way up the fiber. This is an indication that deformation of the aluminum occurs uniformly in both foils, resulting in a uniform stress distribution on the fiber.

In addition to optical fiber cable management, and optical interconnection fabrication, optical fibers embedded in aluminum or other suitable media, can be used to fabricate sensors for a variety of applications. It is well known that changes in optical fiber refraction index when under load can be used to measure strains, temperature, and other physical phenomena. However, exposing the optical fibers to aggressive environments such as high temperatures or reactive chemicals can damage the fibers, rendering the sensing technique useless.

A rapid, low-cost technique for embedding the fibers in a protective casing provides a useful technique for producing optical fiber sensors for strain, temperature and other types of measurements. An arrangement of the type illustrated in FIG. 1D, comprised of a foil feeding system, a fiber placement system, and an ultrasonically excited roller 110 is the most suitable technique for continuously embedding optical fiber in metal. Highly suitable metals include copper and aluminum which are readily ultrasonically bonded at low pressures, however, a wide range of other materials including stainless steel and titanium can be used.

Figure 3A:
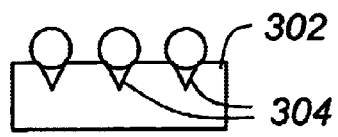
FIG. 3A shows how foil is etched with fiber locating features, after which the fibers are placed.
Figure 3B:
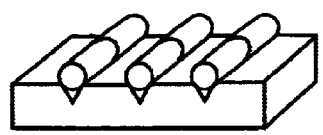
FIG. 3B illustrates fibers terminating in the center of etched foil.
Figure 3C:
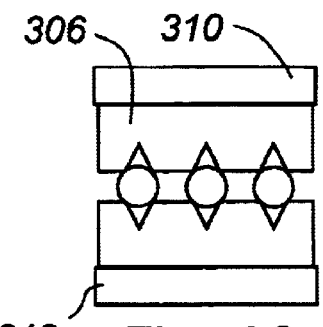
FIG. 3C shows how a cover foil is placed over the terminating fibers, and how ultrasonic consolidation is used to form a hermetic seal.

Another method of additively producing embedded fibers (or monolithic structures) is illustrated in FIG. 3. In FIG. 3A, foil 302 is etched with fiber locating features such as photolithographically-etched grooves 304, after which the fibers are placed. FIG. 3B illustrates fibers terminating in the center of the etched foil. In FIG. 3C, a cover foil 306 is placed over the terminating fibers, and ultrasonic consolidation is used with sonotrodes 310, 312 to form a hermetic seal. This deposition technique is similar in certain respects to 3D printing methods, but includes unique advantages over other methods previously proposed. Existing 3-D printing technologies rely on the use of binders to create 3 dimensional shapes. The binder controls the properties of the object. For example, an object made from a ceramic powder bound by a polymer based adhesive will have the mechanical and, to a large extent, the physical properties of the adhesive, not the ceramic.

Three-dimensional printing is sometimes used to produce metal objects; in such applications, a metal powder is printed with a binder and the binder is burned out in a secondary operation. This is followed by infiltration by a liquid metal which has a lower melting point that the powder, and excellent wettability. An example system is stainless steel powder, with a copper based infiltrant. Again, the properties of the infiltrant will control those of the finished object.

Figure 4A:
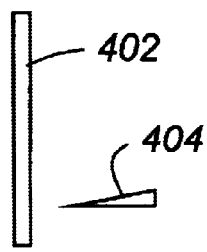
FIG. 4A shows an electrical discharge used to form and detach a droplet from the end of the feed wire.
Figure 4B:
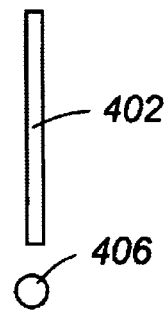
FIG. 4B shows how a droplet impinges on the build surface under the influence of gravity and electromagnetic force.

As illustrated in FIG. 4A, an electrical discharge from a spark electrode 404 is used to form and detach a droplet 406 from the end of the feed wire 402. The feedwire diameter can vary in thickness. For extremely fine features or high resolution variations in material composition a very fine wire may be used. To increase deposition rate on coarser features or large parts, a thicker wire can be used.

When the droplets are deposited, they solidify partially during flight, and "splat" on the surface, forming a partially bonded structure. Porosity of such splatted structures is typically 5–15 percent. This phenomenon has been extensively studied for various metal spraying processes such as plasma spraying, HVOF, and thermal spraying.

Figure 4C:
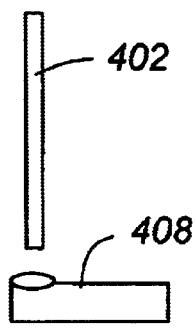
FIG. 4C shows how sufficient splatting occurs to attach the droplet to the surface, despite the fact that the droplet may be mushy or entirely solid when it strikes the surface.

When a wire feedstock is employed, an electrical discharge is used to form and eject a very small droplet of molten metal. The droplet 406 impinges on the build surface 408 under the influence of gravity and electromagnetic force. Although it is mushy or entirely solid when it strikes the surface, sufficient splatting occurs to attach the droplet to the surface 408, as shown in FIG. 4C. The wire indexes over the diameter of the wire, and the process is repeated in the X-Y directions until the entire build region is covered with droplets of the desired material.

Alternatively, the feedstock can be transferred to the build surface using a technique more commonly employed in ball bonding. An electric discharge is used to form a ball at the tip of a wire, and an ultrasonic tool is employed to bond the ball to the surface of the workpiece by pulsing the ball with ultrasonic energy, typically at a frequency of 60 kHz. The tool withdraws, breaking the wire off, and leaving the ball. The wire indexes over, depositing an additional ball, until the entire surface is covered. This approach offers a lower heat input to the workpiece than the technique employing detachment of a liquid droplet to fall to the workpiece, but the deposition rate is also slower.

Figure 4D:
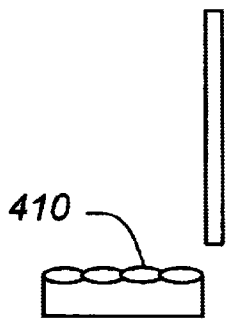
FIG. 4D depicts the deposition of a row or area of metal droplets.
Figure 4E:
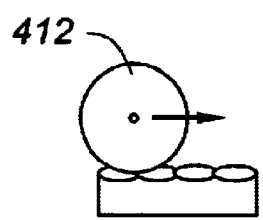
FIG. 4E illustrates how an ultrasonic welding tool is translated across the row of droplets of FIG. 4D.
Figure 4F:
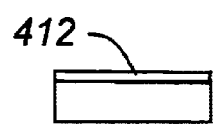
FIG. 4F shows the way in which droplets are mechanically flattened and welded to preceding layers, resulting in a uniform surface and a metallurgical bond in the object being built.

Following the deposition of a row 410 or area of metal droplets (FIG. 4D), an ultrasonic welding tool 412 is translated across the row of droplets, as depicted in FIG. 4E. The droplets are mechanically flattened and welded to the preceding layers, resulting in a uniform surface 414 and a metallurgical bond in the object being built, as shown in FIG. 4F.

An advantage of this approach is that droplets can be deposited in the liquid, mushy or solid state depending on the engineering objectives for the build process. When droplets are formed and discharged electrically, they are cooled during their flight towards the substrate. Depending on droplet size, and distance to the substrate, they may arrive in the solid, mushy or liquid condition. In addition, the droplets are typically subject to supercooling during their flight. This phenomenon has been extensively documented in the metal spraying literature, where it is frequently observed that droplets will remain liquid at temperatures of more than 100 degrees C. below their freezing point. As a result, much of the heat of melting can be dissipated prior to droplet impingement on the substrate, while retaining the ability of the liquid or mushy droplet to splat on the substrate, and partially bond. In fact, high speed video studies of impinging droplets show that an excessively liquid droplets actually produce over spray, as well as fully solidified droplets which bounce off a substrate rather than adhering.

Figure 5:
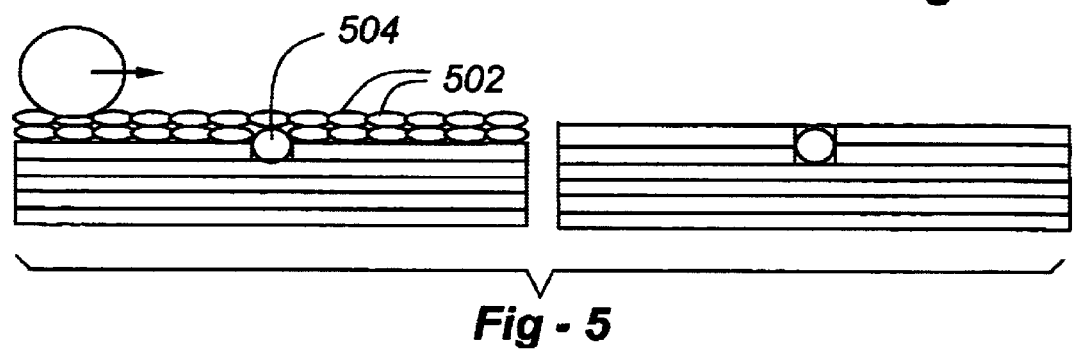
FIG. 5 is a drawing which shows a structure that is partially fabricated, with fibers laid in channels generated via droplets.

Because the droplets are only partially liquid when they arrive at the substrate the thermal load being applied can be controlled. Thus, this technology has advantages for producing composite structures. For example, a structure can be partially fabricated, and ceramic fibers 504 laid in channels generated via droplets 502, as illustrated in FIG. 5. These fibers are then covered with additional material and the whole ultrasonically consolidated. The small volume of material applied and the heat dissipation which occurs prior to droplet impingement prevent the fiber damage which characterizes bulk deposition over fibers.

For the most thermally sensitive applications, the fully solid approach is employed, with the ball formed at the end of the wire, and applied to the surface ultrasonically, prior to complete consolidation. This process is slower than forming and ejecting the droplet simultaneously, but results in the minimal heat input to the workpiece. This is also a suitable technique for optical fiber placement, since droplet sizes on the order of micrometers can be used, and precise fiber placement can be ensured.

When the objective is to build an object with overhangs, cantilevers, or enclosed features, a support material is used. Various support media can be employed. For example, a low melting point wire, such as a solder, could be employed in addition to the build material. This second material would be deposited and consolidated in the same way as the build material. However, following completion of the object it could be melted away at a low temperature to leave only the desired portions.

Alternative media may be used to support overhanging features, including a material which could be injected as a liquid, and would solidify rapidly to support the following layers. Possible liquids include water, ceramic slips, corn starch solutions, etc. The liquid is dispensed by calculating the volume of the region to be filled, and injection precisely that amount of material via a metered fluid delivery system. Following injection, a process such as infrared heating, ultraviolet light curing, freezing, addition of a secondary cure agent, or other process can be employed to accelerate the solidification of the liquid.

Although the invention has been described in terms of embedded fibers carrying low-power optical signals, the invention may be used in other applications, including electrical power transmission. For example, reinforced electrical transmission wires of aluminum, copper or other suitable conductor may be used to strengthen the matrix without reducing conductivity. Such as arrangement also allows the optical fibers to transmit data as well as electrical power over the electrical grid.

The ultrasonic consolidation techniques set forth herein for embedding continuous ceramic fibers in metal are suitable for embedding either optical or alumina fibers in high-purity aluminum, electrical-grade copper and other suitable materials. Furthermore, because the invention is based upon a solid-state process, the liquid metal environment responsible for certain difficulties and limitations is absent. Limitations on material composition are also eliminated, making it possible to use a wider range of matrix metal compositions. As a result, fibers can be embedded more rapidly and at lower cost than in other approaches.

As a further option, silica fibers ($SiO_2$) are used to reinforce the electrically conductive matrix. Silica fibers, while not as strong as alumina, have substantial strength, and will increase the mechanical properties of the metal matrix composite in a way which is similar to that experienced when alumina is used, although the overall improvement resulting will be less, allowing for dependence of properties on fiber volume, processing parameters, etc.

Use of optical fibers to reinforce electrical cables provides the dual advantage of creating stronger transmission line, and giving it the capability to simultaneously transmit data. The advantages of such a product over one with structural reinforcement incapable of transmitting data are many, allowing electrical transmission systems to take advantage of their huge established infrastructure to extend additional data transmission services.

Any of the methods disclosed herein can be used to produce a structurally or optically reinforced electrical transmission wire. However, it is anticipated that the method of placing a fiber tow, with the fibers separated as desired, and under a sufficient tension to prevent them moving during consolidation, between layers of foil of the desired thickness and composition, then consolidating them using an ultrasonically activated roller will be the lowest in cost and highest in productivity.

I claim:

1. A method of embedding one or more optical fibers into a matrix, comprising the steps of:
   positioning an optical fiber onto a substrate;
   supplying one or more increments of material so as to cover at least a portion of the fiber; and
   bonding the increments using a process sufficient to consolidate the increments without melting the material in bulk.

2. The method of claim 1, wherein the material is electrically conductive.

3. The method of claim 2, further including the step of using the fiber for data transmission.

4. A product with embedded optical fibers made according to the method of claim 3.

5. The method of claim 2, further including the step of using the fiber for reinforcement.

6. The method of claim 2, further including the step of using the fiber as a sensor.

7. The method of claim 1, wherein the step of bonding the increments includes ultrasonically bonding the material.

8. A product with embedded optical fibers made according to the method of claim 7.

9. The method of claim 1, wherein two fibers which are disposed end-to-end within the material, thereby forming an interconnection.

10. The method of claim 1, wherein the material is a metal or alloy.

11. The method of claim 1, wherein the material is supplied in the form of layers.

12. The method of claim 1, wherein the material is supplied in the form of droplets.

13. The method of claim 1, further including the step of forming a groove in the substrate to receive the fiber.

14. The method of claim 1, wherein the substrate and the material are of the same composition.

15. A product with embedded optical fibers made according to the method of claim 1.

16. The method of claim 1, including a fiber which ends within the material, thereby forming a termination.

17. A method of embedding one or more optical fibers into a matrix, comprising the steps of:
   providing a substrate of the material and positioning the optical fiber thereon;
   supplying one or more increments of material so as to cover at least a portion of the fiber; and
   ultrasonically bonding the increments to consolidate the increments without melting the material in bulk.

18. The method of claim 17, wherein the material is electrically conductive.

19. The method of claim 18, further including the step of using the fiber for data transmission.

20. The method of claim 18, further including the step of using the fiber as a sensor.

21. A product with embedded optical fibers made according to the method of claim 20.

22. The method of claim 17, further including the step of using the fiber for reinforcement.

23. A product with embedded optical fibers made according to the method of claim 22.

24. The method of claim 17, including a fiber which ends within the material, thereby forming a termination.

25. The method of claim 17, wherein two fibers which are disposed end-to-end within the material, thereby forming an interconnection.

26. The method of claim 17, wherein the material is supplied in the form of layers.

27. The method of claim 17, wherein the material is supplied in the form of droplets.

28. The method of claim 17, further including the step of forming a groove in the substrate to receive the fiber.

29. The method of claim 17, wherein the substrate and the material are of the same composition.

30. The method of claim 1, including the step of placing multiple fibers parallel to one another.

31. A product with embedded optical fibers made according to the method of claim 17.

32. The method of claim 17, wherein the material is a metal or alloy.

* * * * *